Patented Aug. 9, 1938

2,126,283

UNITED STATES PATENT OFFICE 2,126,283

PROCESS OF MANUFACTURING GASOLINE OR OTHER LIQUID HYDROCARBONS

James R. Rose, Edgeworth, Pa., assignor of three-fourths to Michael L. Benedum and Joseph C. Trees, both of Pittsburgh, Pa.

No Drawing. Application February 3, 1937, Serial No. 123,855

2 Claims. (Cl. 196—10)

My invention relates to a process of manufacturing gasoline or other liquid hydrocarbons wherein a catalyst is employed which has proven to be particularly effective in the manufacture of such liquid hydrocarbons from the waste gases produced in the operation of oil refining plants. These gases, known generally to the trade as "still gases", contain paraffins and olefins which may be effectively broken or split apart by the aid of my catalyst, in connection with a process of treatment such as described and claimed in my copending application Serial No. 111,654, filed November 19, 1936.

My catalyst comprises a mixture of the mineral carnotite with barium fluoride. The preferred manner in which my catalyst is employed in the treatment of the aforesaid gases will now be set forth.

The particular gaseous mixture to be treated is delivered to a suitable receiver, such as an ordinary gas holder, and thence to a compressor whereby the mixture is subjected to and maintained under a pressure of from 200 to 1200 pounds per square inch. It is then conducted through the tubes of a suitable heating stove where the temperature will be raised to from 200° to 1000° F., while still under the aforesaid pressure; the gaseous mixture, while still under the aforesaid pressure and temperature, is then passed in contact with my catalyst, contained in a suitable chamber or chambers and, after having been reacted upon by the catalyst, is conducted through a cooler, while still under the aforesaid pressure. The resultant liquid and whatever gases may have been uncondensed in the cooler are then delivered into a receiver through a pressure-reducing valve, the pressure in the receiver being maintained at approximately 150 pounds per square inch. The gases which have not been condensed may at this stage be conducted back into the holder, to be recycled therefrom, together with the still gases therein. From the receiver, the liquid, with whatever unliberated and uncondensable gases may remain therein, may be delivered by a pump into a stabilizer.

I have found that, in the practice of a process such as described, the efficient extraction of gasoline and other hydrocarbon compounds from the mixture of gases which may be treated is dependent upon the use of a suitable catalyst; and the catalyst which I shall now describe has given extremely satisfactory results. It comprises a mixture of carnotite with barium fluoride, both ingredients being preferably in a finely divided condition. Where the gases to be treated have a relatively low olefin or paraffin content, the barium fluoride is mixed with the carnotite in the proportion of from 1 to 12 ounces of barium fluoride to each pound of carnotite used. In actual practice, a small amount of carnotite is introduced into the catalyzing chamber or chambers and the barium fluoride is sprinkled on top of the carnotite, in about the proportion mentioned. From time to time, successive charges of carnotite and barium fluoride are added to the chamber or chambers in the manner and in the proportions described for the first charge.

The carnotite, being radioactive, tends, when mixed with the barium fluoride, to split or break apart the paraffins and olefins found in the gaseous mixture being subjected to my process and to facilitate the recombining of the various elements, produced by this action, into gasoline or other liquid hydrocarbon fuel products.

I have found that my catalyst has a maximum efficiency when operating between temperatures of approximately 500° and 1000° F.

Having thus described my invention, what I claim is:

1. In the process of manufacturing gasoline or other liquid hydrocarbons from still gases, passing the gases while under a pressure of from 200 to 1200 pounds per square inch and at a temperature of from 500° to 1000° F. in contact with a catalyst consisting of a mixture of carnotite and barium fluoride in approximately the proportion of 1 to 12 ounces of barium fluoride to one pound of carnotite.

2. In the process of manufacturing gasoline or other liquid hydrocarbons from still gases, passing the gases while under a pressure of from 200 to 1200 pounds per square inch and at a temperature of from 500° to 1000° F. in contact with a catalyst consisting of carnotite having barium fluoride sprinkled thereon, in approximately the proportion of 1 to 12 ounces of barium fluoride to one pound of carnotite.

JAMES R. ROSE.